Patented Mar. 13, 1934

1,950,459

UNITED STATES PATENT OFFICE 1,950,459

SALT MIXTURES

Karl Max Seifert, Berlin-Charlottenburg, Germany, assignor, by mesne assignments, to The Griffith Laboratories, Chicago, Ill.

No Drawing. Application January 26, 1931, Serial No. 511,441. In Germany February 21, 1930

9 Claims. (Cl. 23—1)

The invention relates to the manufacture of salt mixtures containing in addition to a main constituent a very small amount of one or several secondary constituents.

When such salt mixtures are mixed in the dry state in the usual manner, it is disadvantageous that even when they are used in a finely ground state no homogeneous mixture can be obtained it being impossible to evenly incorporate with the main constituents the secondary ingredients being present in small amounts only.

When such mixtures are made by dissolving the individual substances in a common solvent and then allowing the solution to crystallize, then the mixture obtained is also not homogeneous since the individual constituents crystallize at different times according to their solubilities.

As with regard to the effect the secondary constituents being present in small quantities are often at least as important as the main constituent, and may in certain circumstances be even more important, the danger arises that, when only small amounts of such salt mixtures are used, the desired constituents are not present in the used portion of the mixture.

The present invention is based on the discovery that completely homogeneous salt mixtures may be obtained by dissolving the individual constituents in a minimum of water, and should it be necessary, with addition of colloidal foaming or thickening substances, as starch, dextrine, gelatine, glue, saponine, hemi-cellulose (e. g. from the grains of the locust beans, the so called Tragasol), agar, tragaganth etc. These highly concentrated solutions preferably saturated cold are then quickly dried on the drying cylinders in vacuo or in the ordinary way, or by means of one of the well known spraying processes or in a similar way. Through this quick drying method the whole residue remains homogeneously mixed there being no time for fractional crystallization, and the residue is not obtained in discernable crystals but as a fine powder. In using, for instance, drying cylinders a very thin layer of the saturated solution is formed on the cylinders which forms at once small bubbles on the hot surface and is scraped off whilst still drying by the scrapers. By the spraying process also a voluminous extremely light salt dust without visible crystalline structure is formed. Only under the microscope individual crystals are discernable.

The spray drying process and the roll drying process may be considered as equivalents for the broad purpose of dispersing the solution to form a high specific surface, in the one case as mist particles or droplets, and in the other case as a film. The roll drying process is preferred for the purposes of the present invention because the bubbling of the liquid on the hot rolls further disperses the solution into the thin films which characterize bubbles. These are formed at the point of evaporation, and so quickly does the water then evaporate that a fine powder is the ultimate result.

The colloidal substances, added if desirable, act as stabilizators during the evaporation and prevent to a particularly high degree the formation of a regular crystalline structure of the salts during the drying.

In this way one obtains a soft extremely finely ground powder of thoroughly homogeneous composition having an invariable content of the desirable constituents and of the desired percentage when employed in a dry state as well as when dissolved.

The invention can be made use of in very many industries.

As an example for such salt mixtures containing one constituent in a very small amount in comparison with the main constituent mention may be made of the table-salt mixture which is prescribed in several European countries and which contains a small amount of an iodine salt, mainly potassium iodide with a view to prevent the endemic maladies of the thyroid glands. Since such salt is naturally only employed in very small quantities, it oftens happens that no potassium iodide is contained in the part of salt just taken from the bulk.

A further example is the usual fine table salt, which contains very small percentages of certain salts for the purpose of preventing the hygroscopicity of the common salt. These table salts consist for instance of common salt with 0.4 per cent sodium phosphate or 0.75 per cent calcium phosphate.

In other industries also homogeneous salt mixtures are of importance. For example, great quantities of common salt are used for the preservation of raw hides, either immediately after the slaughtering and before the transport of the hides from the slaughter houses to the tanneries, or for the transport of the so called foreign hides from oversea countries, e. g. Argentina. It has been found that the usual dry or wet pickling is not always sufficient to protect the costly hide material against destruction, and to also ensure in handling the hides a sufficient protection against infectious disease (e. g. anthrax). For this reason the salt used for preserving the hides is mixed for increasing its efficiency with small quantities of different additions as, e. g. calcined soda, sodium fluoride, zinc chloride, sodium sulphate, magnesium chloride etc. Now it is of great importance that these additions are mixed entirely homogeneously with the common salt as otherwise local damages of the hide may occur. It is likewise important that the preserving salt is employed in a very finely distributed form so that is easily taken up by and deeply penetrates into the hide. Such salt mixtures can advantageously be made by employing the above described process.

A further example for the applicability of the present invention is the manufacture of luminous masses which contain very small amounts of the substances causing the phosphorescence mixed with other materials serving as carriers for the luminous substances. The process may further be used for the manufacture of bath salts in which only very small traces of radium preparations are contained. For many other industries also where in any stage denatured salt is used it is often of importance that the additions are not only coarsely mixed with the salt but are homogeneously distributed. Such denatured salts consist for instance of 99.7 parts common salt and 0.3 parts zinc chloride, containing also starch, gelatine or the like if desired. In order to more clearly illustrate the nature of my invention I will give one specific example of its practice, although it will be readily understood that my invention is in no way limited to or by the example given.

99.7 parts common salt and 0.3 parts zinc chloride (molten) are dissolved in 300 parts water. A colloidal substance, for instance 0.5% gelatine or 0.25% pectin may previously be added to the water. This solution is, preferably after preheating, dried on a rotary drier, whereby a very fine voluminous entirely homogeneous powder is obtained.

The present invention employs sodium chloride to act as a unit crystal vehicle for other salt substance to avoid the alternative of a mechanical mixture of crystals of different materials. The process herein described effects the desired result in some way by its quick-drying step. Sodium chloride is characterized by an ability to form "negative crystals" or crystals in which cavities of crystal form exist. As a result of some mechanism in the process described the minor salts may be found contained within the salt crystal, and the location is possibly related to such cavities, which it appears may readily be sealed over by sodium chloride in the process.

The present invention aims at the avoidance of mechanically mixing originally distinctive salts to secure a uniform product of one crystal type. Pure or commercial sodium chloride may be used and such materials are herein defined in the usual manner by the term "comon salt". It is well known that common salt may contain small quantities of other salts, notably magnesium chloride. The auxiliary, or secondary, salts of the present invention are considered to be additional to or distinct from such impurities of the common salt. For the purpose of treating hides, it has been considered that the usual impurities of common salt are detrimental to the process when a salt powder is used and a salt free from them has been recommended in U. S. Patent No. 1,091,236. The present invention affords a means for making a new salt powder having additional salts, such as zinc chloride, and sodium fluoride, which have been added to common salt, according to said patent, to overcome the bad effects caused by impurities in common salt.

It is therefore to be understood that in the accompanying claims the invention is set forth to indicate that there is a product differing from common salt which may be made by dissolving common salt together with different salt or salts in water, and so treating them as to secure a product of the character described.

What I claim is:

1. A powdery composition of matter for the treatment of raw hides including in combination a large quantity of sodium chloride and a small quantity of a mixture of salts which increase the preserving efficiency of the sodium chloride, including calcined soda, sodium fluoride, zinc chloride, sodium phosphate and magnesium chloride, said salts being incorporated with the sodium chloride in each particle of a mass as a residue from the rapid evaporation of water from a solution thereof.

2. A powdery salt mass for the treatment of raw animal surfaces consisting of a mass of particles, all of which are essentially and predominantly of common salt and within which particles is enclosed in solid form a minor quantity of different water soluble salt substance added to the common salt to increase its efficiency in the said treatment.

3. A powdery salt mass for the treatment of raw animal surfaces consisting of particles, all of which are essentially and predominantly of common salt and within which particles is enclosed in solid form a colloid and a minor quantity of different water soluble salt substance added to the common salt to increase its efficiency in the said treatment.

4. A powdery salt mass for the treatment of raw hides and skins consisting of particles, all of which are essentially and predominantly of common salt and within which particles is enclosed in solid form a minor quantity of different water soluble salt substance added to the common salt to increase its efficiency in the said treatment.

5. A powdery salt mass for the treatment of raw hides and skins consisting of particles, all of which are essentially and predominantly of common salt and within which particles is enclosed in solid form a colloid and a minor quantity of different water soluble salt substance added to the common salt to increase its efficiency in the said treatment.

6. The method of combining with common salt a small proportion of other soluble salt substance which increases the preserving efficiency of dry sodium chloride powder when used on fresh animal surfaces, which comprises forming a strong solution containing as solute a major quantity of common salt and a minor quantity of said water soluble salt substance, dispersing said solution to provide a large specific surface, and quickly evaporating water from the dispersed solution, whereby to form a powder consisting essentially of microscopic sodium chloride crystals within which crystals the minor salt substance is carried.

7. The method of combining with common salt a small proportion of other soluble salt substance which increases the preserving efficiency of dry sodium chloride powder when used on fresh animal surfaces, which comprises forming a strong solution containing as solute a major quantity of common salt and a minor quantity of said water soluble salt substance, dispersing the solution into film-form, and heating the dispersed solution quickly to evaporate water whereby to form a powder consisting essentially of microscopic sodium chloride crystals within which the other salt substance is carried in solid form.

8. The method of combining with common salt a small proportion of other soluble salt substance which increases the preserving efficiency of dry sodium chloride powder when used on fresh animal surfaces, which comprises forming a strong solution containing as solute a major quantity of common salt and a minor quantity of said water soluble salt substance, dispersing the solution into film-form, and subjecting the dispersed solution to a boiling heat, whereby to evaporate water and form a residual powder consisting essentially of microscopic sodium chloride crystals within which the other salt substance is carried in solid form.

9. The method of combining with common salt a small proportion of other soluble salt substance which increases the preserving efficiency of dry sodium chloride powder when used on fresh animal surfaces, which comprises forming a strong solution containing as solute a major quantity of common salt and a minor quantity of said water soluble salt substance, spreading the solution in a film on a heated surface, heating said surface to a boiling temperature for the solution, and allowing water to evaporate from the film on the surface, whereby to form a residual powder consiting essentially of microscopic sodium chloride crystals within which the other salt substance is carried in solid form.

KARL MAX SEIFERT.